United States Patent [19]

Harlan et al.

[11] 3,733,111
[45] May 15, 1973

[54] TAPERED ROLLER BEARING ASSEMBLY WITH ANTIFRICTION MOLDED CAGE

[75] Inventors: Jerry C. Harlan, Madison; William A. Angus, Lebanon, both of Tenn.

[73] Assignee: TRW Inc., Cleveland, Ohio

[22] Filed: June 29, 1971

[21] Appl. No.: 157,931

[52] U.S. Cl. .................................................308/218
[51] Int. Cl. ............................................F16c 33/46
[58] Field of Search.......................308/214, 217, 218

[56] References Cited

UNITED STATES PATENTS 1,911,544    5/1933    Beard..................................308/218
3,141,711    7/1964    Biedinger..........................308/218

FOREIGN PATENTS OR APPLICATIONS 775,436    10/1934    France...............................308/218

Primary Examiner—Charles J. Myhre
Assistant Examiner—Frank Susko
Attorney—Carlton Hill et al.

[57]    ABSTRACT

A tapered roller bearing cage assembly in which the retainer cage is formed of a one-piece molded plastic ring having a series of circumferentially spaced slots for receiving the roller elements of the assembly and ribs between the slots for maintaining the roller elements within the slots.

1 Claim, 6 Drawing Figures

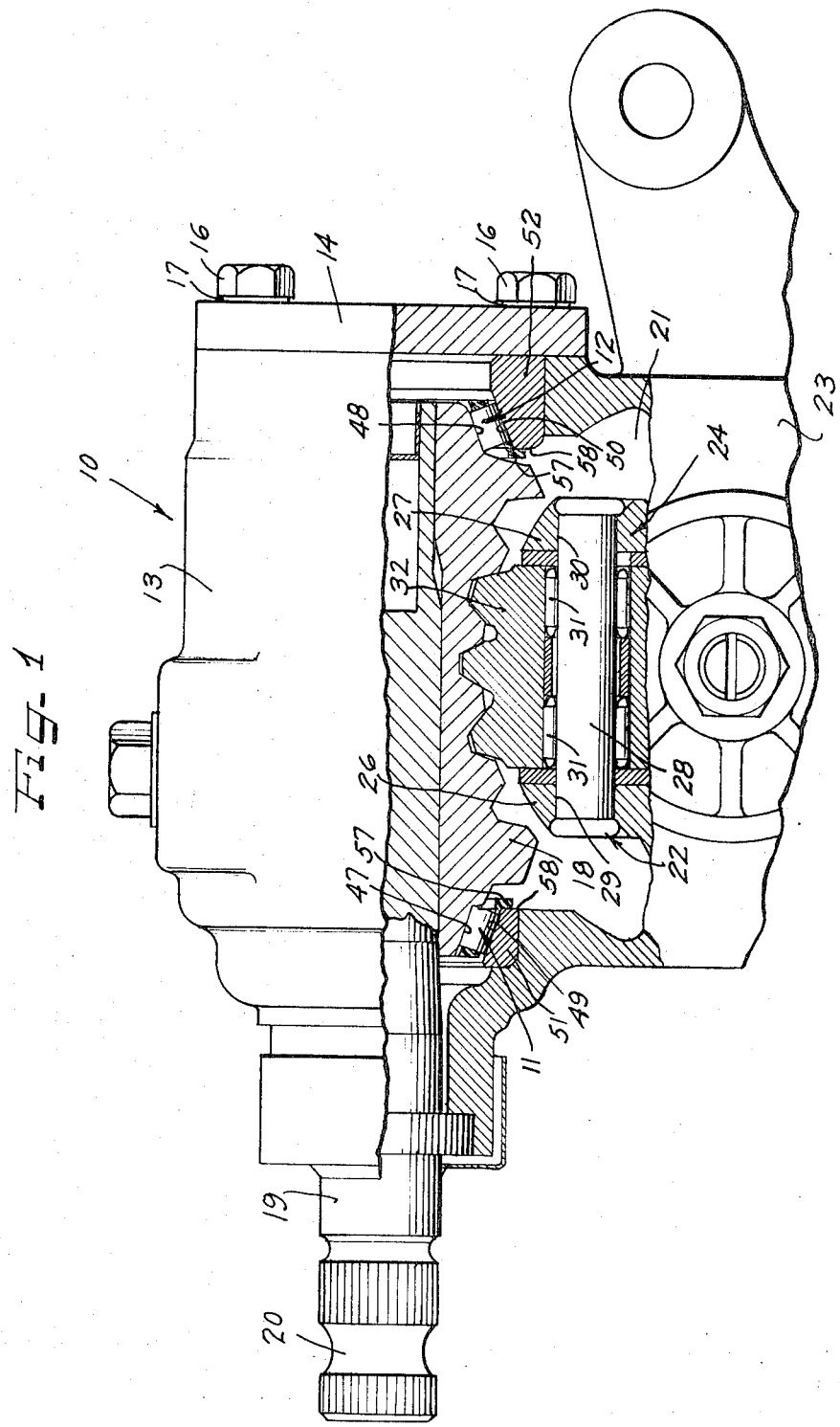

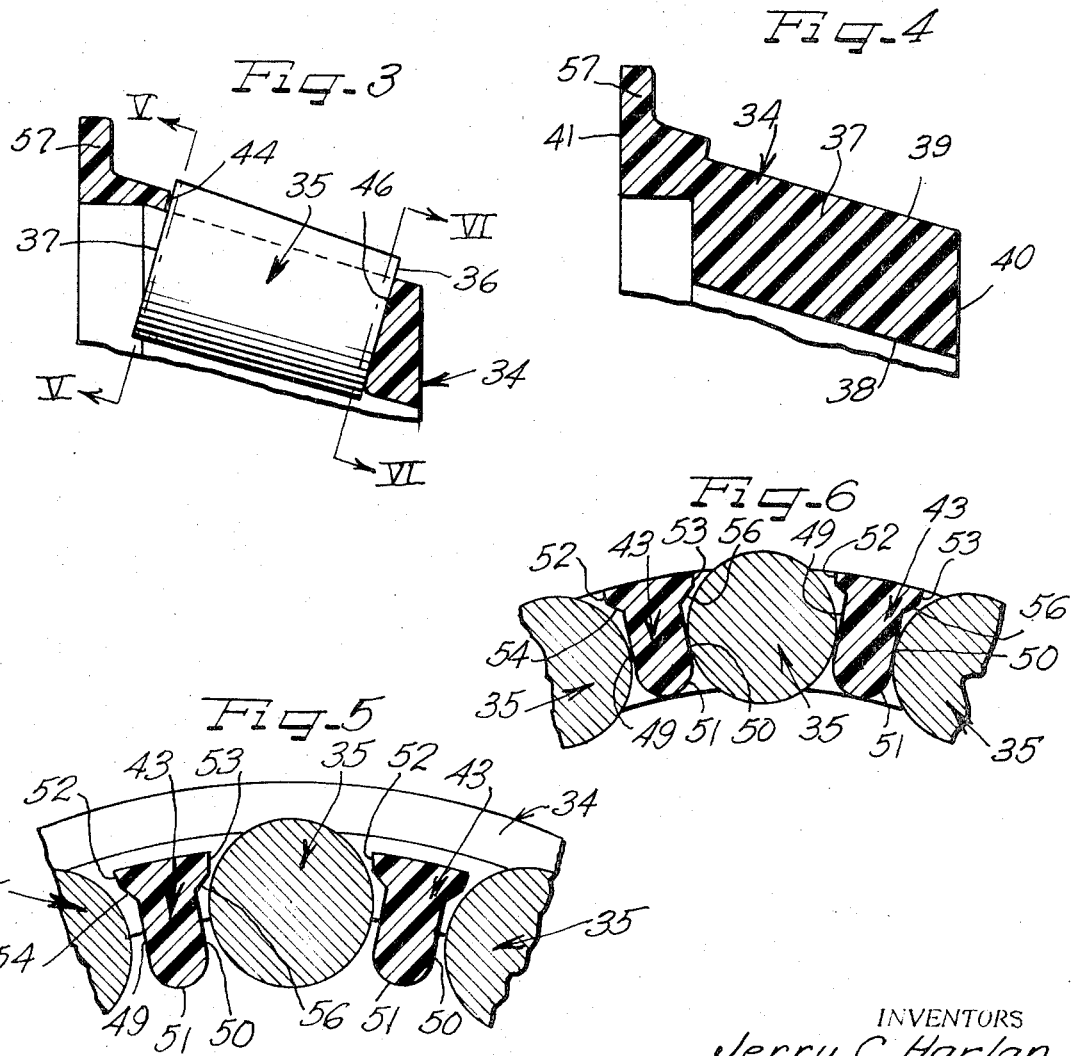

3,733,111

TAPERED ROLLER BEARING ASSEMBLY WITH ANTIFRICTION MOLDED CAGE

BACKGROUND OF THE INVENTION

The present invention relates generally to the field of antifriction bearings and more particularly to the bearing retention cages in which the rolling elements of the bearing are housed between the bearing races.

In the manufacture of antifriction (ball or roller) bearing, the rolling elements are generally fitted in a cage with either of two rings in which the inner and outer races are formed secured concentric to the cage. The assembly of the inner ring or the outer ring or both, along with the cage and rolling elements, is then either stored or shipped for final assembly.

In either event, means are generally required to hold the rolling elements in the cage after manufacture and until the assembly of the entire antifriction bearing is completed. Various means have been provided to retain the rolling elements in the cage during this intermediate period. Generally such means have comprised an inner or outer ring which cooperates with projections which extend from a webbed section of the cage and which are bent over the various rolling elements after they are inserted in the cage. Prior art rolling element retention means have been generally acceptable but there are situations which render such cage construction and retention means less than entirely satisfactory. First of all, there are situations (such as, for example, in certain worm and roller manual steering gear) where the inner and outer races of the rolling elements comprise surfaces which are formed directly on structural components of the devices in which the bearings are mounted. In such situations the bearing assembly, as manufactured and shipped to the assembly point, need only comprise a retention cage and the rolling elements mounted therein. Neither an inner or outer bearing ring is required in such arrangements so far as the final bearing assembly is concerned, although one or the other may be required merely to hold the rolling elements in the cage until final assembly.

Furthermore, the cages of antifriction bearings represent an important item of cost in the manufacture of the overall assembly. Any reduction in cost of manufacture of cages has a significant effect in reducing the manufacturing cost of the entire assembly.

In accordance with the principles of the present invention, the rolling elements of an antifriction bearing can be easily inserted into and retained within the bearing cage without the necessity of relying upon an inner or outer ring to perform a retention function. Furthermore, the costs involved in manufacture of the cage are reduced below those corresponding to cages manufactured heretofore.

In accordance with the principles of the invention, the cage comprises a one-piece injection molded plastic cage ring. While plastic cages have been known heretofore (see, for example, Cobb U.S. Pat. No. 2,550,911 and Goodwin et al. U.S. Pat. No. 2,550,912) the present invention utilizes a novel configuration which not only provides self-retention means for the rolling elements but also offers advantages in assembly, particularly in applications in which the inner and outer races of the bearing assembly are formed on surfaces of structural components of the device on which the bearing is mounted.

In view of the foregoing, objects of the invention are to reduce the manufacturing cost of a bearing cage, to simplify the construction of retention means for maintaining the rolling elements within the cage, to provide a roller bearing cage with roller retention means whereby the rollers may be quickly and easily inserted and retained within the cage and to provide a relatively inexpensive and easily manufactured bearing cage and rolling element assembly.

SUMMARY OF THE INVENTION

In one respect, the invention may be summarized as comprising a plastic bearing cage comprising a cage ring in which are formed a plurality of circumferentially spaced and alternately arranged slots and ribs. The ribs are deformable from a free state to a stressed state configuration. As the rolling elements are inserted into the cage ring, the ribs are spread to permit insertion of the elements into the slots. After the rolling elements have been urged into the slots the ribs resume their free state configuration, as a result of which the rolling elements are retained within the slots.

While the present invention has particular utility in a variety of applications it is particularly suited for those applications in which it is difficult or inconvenient or unnecessarily expensive to utilize an inner or outer ring in the bearing assembly, which ring would normally be utilized to retain the rolling elements within the cage during storage, shipping and assembly of the cage and rolling elements.

The bearing cage featured in this invention is particularly advantageous when utilized in connection with roller bearing elements and in accordance with the teachings of the invention may be used as a retainer for commercial tapered roller bearing elements.

Many other features, advantages and additional objects of the present invention will become manifest to those versed in the art upon making reference to the detailed description which follows and the accompanying sheets of drawings in which preferred structural embodiments incorporating the principles of the invention are shown by way of illustrative example only.

BRIEF DESCRIPTION OF THE DRAWINGS

FIG. 1 is a partially elevational and partially sectional view of a worm and roller type steering gear assembly incorporating an antifriction bearing arrangement constructed in accordance with the principles of the present invention.

FIG. 2 is an enlarged fragmental elevational view of a bearing cage of the invention with tapered roller elements mounted therein.

FIGS. 3 and 4 are sectional views taken respectively along lines III—III and IV—IV of FIG. 2.

FIGS. 5 and 6 are sectional views taken respectively along lines V—V and VI—VI of FIG. 3.

DESCRIPTION OF THE PREFERRED EMBODIMENT

FIG. 1 illustrates a manually operated worm and roller steering gear assembly indicated generally at reference numeral 10. The assembly 10 includes a pair of anfifriction bearing assemblies 11 and 12 constructed in accordance with the principles of the present invention. The bearing assemblies 11 and 12 find particular utility in the steering gear assembly 10 because of the relatively low operating speed involved and because of the thrust and radial loads imposed upon the bearing assembly.

The steering gear assembly 10 may be more particularly characterized as comprising a housing 13 which is closed at one end by a cover 14 retained on the housing 13 by means of a plurality of fastening nuts 16 and lock washers 17.

The bearing assemblies 11 and 12 journal a worm 18 formed on a portion of a work input shaft 19 which extends into the housing 13. The shaft 19 has a coupling portion 20 formed at the outer end thereof for integration of the worm and roller steering gear assembly 10 in the steering system of a dirigible vehicle.

The housing 13 has an enlarged portion forming a housing recess 21 in which is disposed a roller tooth subassembly indicated generally at reference numeral 22. Another cover plate 23 is retained on its adjacent portion of the housing 13 by appropriate fastening means. Referring to the roller tooth subassembly 22, there is provided a cross shaft 24 having spaced apart shaft ears indicated at 26 and 27. The ears 26 and 27 extend generally parallel to one another and are disposed to project upwardly from a lower bight portion of the cross shaft 27. A pin 28 extends through bores 29 and 30 formed in the ears 26 and 27, which bores are counter-bored at the ends thereof for receiving enlargements formed on the opposite ends of the pin 28 for the purpose of retaining the pin in firm assembly with the cross shaft 24.

A needle bearing assembly 31 serves to journal a roller tooth 32 on the pin 28. The roller tooth 32 is characterized as comprising a plurality of teeth on its peripheral surface which engage mating tooth portions formed on the worm 18.

During operation of the gear assembly 10, rotation of the work input shaft 20 has the effect of rotating the worm 18 about the axis of rotation of the shaft 20, which in turn rotates the cross shaft 24 about its axis of rotation, as will be understood by those versed in the art. The total load imposed on the worm 18 generally includes both a thrust and a radial load. These are the loads to which the bearing assemblies 11 and 12 are subjected.

Since the assemblies 11 and 12 are identical only bearing assembly 12 will be discussed in detail.

Referring to FIGS. 2-6 the bearing assembly 12 comprises a bearing cage 33 which includes a cage ring 34 and a series of rolling elements 35 which are carried on the cage ring 34. In the embodiment illustrated the rolling elements 35 comprise commercial tapered roller elements, one end 36 of each of which is smaller than an opposite end 37.

The cage ring 34 is similarly generally frusto-conically shaped and comprises a wall member 37, the inner and outer surfaces 38 and 39 whereof constitute surfaces of revolution. Opposite ends 40 and 41 of the wall member 37 extend radially with respect to the axis of the cage ring 34.

Provided in the wall member 37 are wall means forming a plurality of generally axially extending circumferentially spaced alternately arranged slots 42 and ribs 43. Referring to FIG. 3, each of the slots is bounded at the axial ends thereof by means of a pair of wall or abutting surfaces 44 and 46 which extend in parallel relation to the end wall 36 and 37 of their respective roller elements and confine or restrict the roller elements against axial movement.

In assembled relation, the axes of the roller elements 35 intersect the axis of the cage ring 34 at a point therealong. The cage ring 34 retains the roller elements 35 in assembled relation until the cage assembly 33 is mounted in place in the housing 13 of the device 10 or utilized in some similar application.

It is noted that the bearing assemblies 11 and 12 do not include an inner or an outer ring as are generally included in antifriction bearing assemblies. Instead, a pair of inner races 47 and 48 are formed on the ends of the worm 18, and outer races 49 and 50 are formed on structural components 51 and 52 of the device 10. Since the assemblies 33 do not include an inner or outer race to assist in retaining the roller elements 35 within the cage ring 34 it is highly desirable that other retention means be provided for this purpose.

Referring again to FIGS. 2-6, the cage ring 34 is made of resilient plastic material, preferably nylon. Further, the ring 34 is of one-piece construction, preferably formed by means of an injection molding process. That particular manufacturing process lends itself to many economies in the manufacture of the ring 34, and the elastomeric characteristics of the nylon are particularly advantageous during assembly and retention of the roller elements 35 as discussed hereinafter.

Each of the ribs 43 comprises a pair of radially extending side walls 49 and 50 connected at the radially inner ends thereof by a semi-circular wall 51. The radially outer end of each of the ribs 43 is enlarged and comprises a pair of mutually inclined walls 52 and 53 which are connected to the side walls 49 and 50 by means of a pair of transition walls 54 and 56. The facing walls 52 and 53 of adjacent ribs 51 do not extend along intersecting lines but instead extend in parallel relation to one another.

Referring to FIG. 5, it is noted that the diameter of the large end 37 of each of the roller elements 35 is greater than the distance between the facing walls 52 and 53 of adjacent ribs 43.

Referring to FIGS. 5 and 6, the ribs 43 extend generally radially with respect to the axis of the cage ring 34. As a consequence, the radially inner ends of the ribs 43 that is, the ends adjacent the arcuate wall 51, are spaced from each other circumferentially a distance which is less than the distance between the radially outer ends of the ribs 43. Thus, as shown in FIG. 6, the diameter of each of the roller elements 35 at the smaller end 46 thereof is greater than the circumferential distance between the facing walls 50 and 49 of adjacent ribs 43.

In view of the foregoing it will be appreciated that the roller elements 35 are not only restrained against axial movement in the slots 42, but are also restrained against radial movement since, at both ends 36 and 37, the diameter of each of the roller elements 35 is greater than the circumferential distance between corresponding points along the radial extent of the ribs 43.

Because of the resiliency and flexibility of the ribs 43 the roller elements 35 are inserted into the slots 42 merely by pressing the elements 35 against the side walls of the ribs 43. After the roller elements 35 have been inserted into the slots 43 the confining action of the walls of the ribs 43 serve to retain the elements 35 within their respective slots 42.

In this respect it is noted that both the radially inner and outer wall portions of the facing surfaces of adjacent ribs 43 are circumferentially spaced a distance which is less than the diameter of the roller elements 35 at any point along the axial extent of the roller elements 35. The central portion of the facing side walls of the ribs 43, however, are circumferentially spaced a distance which is greater than the diameter of the roller elements 35 at a corresponding axial point, thus permitting limited radial movement of the roller elements 35 within the slots 42.

Formed at the outer or enlarged end of the cage ring 34 is a radially outwardly extending flange or bead 57 which performs the function of axially locating or positioning the cage 33 in the assembled condition of the worm and roller gear assembly 10 in one direction by abutting a radial wall 58 formed on its respective structural component 51 or 52.

It will be appreciated from the foregoing that the improved cage assembly of the present invention involves economies in manufacture, assembly, storage, transport and final assembly in the structure in which it is to be utilized. Thus, not only is the cage ring 34 made of one piece injection molded plastic construction but furthermore, by virtue of the construction and arrangement thereof, provides roller element retention means without the necessity of utilizing an inner or outer ring or, as is required in some prior cage assemblies, without the necessity of bending over ears, tabs, tines or the like to retain the rolling elements in the cage.

Although minor modifications might be suggested by those versed in the art, it should be understood that we wish to embody within the scope of the patent warranted hereon all such modifications as reasonably come within the scope of our contribution to the art.

What we claim is:

1. A tapered roller bearing cage assembly comprising a one-piece generally frusto-conically shaped plastic cage having means forming thereon a series of uniform circumferentially spaced ribs for providing roller element retention slots therebetween, and a corresponding number of roller elements held within said slots by said ribs and intersecting along the axes thereof at a point on the axis of said cage, each of said ribs comprising, in a plane normal to the axis of the adjacent roller element, a radially inner end and a radially outer end and also including a pair of generally radially extending side walls each having a straight portion between the inner and outer ends of the rib and an enlarged offset portion at the outer end thereof, the straight portions of the two side walls of each of said ribs being disposed in parallel relation and the circumferential distance therebetween constituting the greatest circumferential thickness of the rib from said enlarged radially outer end to the radially inner end thereof, the circumferential distance between adjacent ribs being greatest between the radially inner and outer ends thereof for retention of said roller elements therebetween.

* * * * *